United States Patent [19]

Sekii et al.

[11] 4,452,073

[45] Jun. 5, 1984

[54] CHASSIS DYNAMOMETER

[75] Inventors: Tsugio Sekii, Kobe; Kensaku Jinbo, Akashi, both of Japan

[73] Assignee: Mitsubishi Denki Kabushiki Kaisha, Tokyo, Japan

[21] Appl. No.: 370,546

[22] Filed: Apr. 21, 1982

[51] Int. Cl.³ .............................. G01M 15/00
[52] U.S. Cl. .................................... 73/117
[58] Field of Search .............. 73/117, 862.28

[56] References Cited

U.S. PATENT DOCUMENTS

| | | | |
|---|---|---|---|
| 1,964,532 | 6/1934 | Platzer | 73/117 |
| 3,490,276 | 1/1970 | Maxwell et al. | 73/117 |
| 4,077,255 | 3/1978 | Murakami | 73/117 |

*Primary Examiner*—Jerry W. Myracle
*Attorney, Agent, or Firm*—Wenderoth, Lind & Ponack

[57] ABSTRACT

A chassis dynamometer includes a bed and a dynamo mounted on the bed, the dynamo having extending from opposite lateral sides thereof oppositely directed end portions of a dynamo shaft. Each of a pair of drums is snugly fitted to a respective end portion of the dynamo shaft. A disc of a disc brake is fitted to a first end portion of the dynamo shaft at a position axially outwardly of the fitting of the respective drum to such first end portion. A coupling joint is fitted to a second end portion of the dynamo shaft at a position axially outwardly of the fitting of the respective drum to such second end portion.

7 Claims, 8 Drawing Figures

CHASSIS DYNAMOMETER

BACKGROUND OF THE INVENTION

This invention relates to a chassis dynamometer, and more particularly to improvements in the arrangement of a dynamo body and drums of a chassis dynamometer.

Conventional chassis dynamometers include mechanical inertia flywheels. Drums are also included, and they are sometimes installed in an overchanging fashion.

Chassis dynamometers of the newest type are not equipped with any mechanical flywheel, and they perform the inertia simulation controls of D.C. dynamos (electrical inertia systems).

This invention is more effective in a simple chassis dynamometer with an electrical inertia system than in a conventional chassis dynamometer equipped with a mechanical inertia flywheel. More specifically, while the installation space of mechanical parts is much smaller in a chassis dynamometer with an electrical intertia system than in a conventional chassis dynamometer having a mechanical flywheel, this invention reduces the installation space still more.

SUMMARY OF THE INVENTION

An object of this invention is to provide a chassis dynamometer which is compact as a whole.

Another object of this invention is to provide a chassis dynamometer which is easy to maintain.

In one aspect of performance of this invention, a chassis dynamometer is characterized in that a dynamo body is arranged between drums which receive rotations of tires.

BRIEF DESCRIPTION OF THE DRAWINGS

FIG. 1 is a front view showing the construction of a prior-art chassis dynamometer, while

FIG. 4 is a front view, partly broken away, showing an embodiment of this invention, while

DETAILED DESCRIPTION OF THE INVENTION

Figure 1:
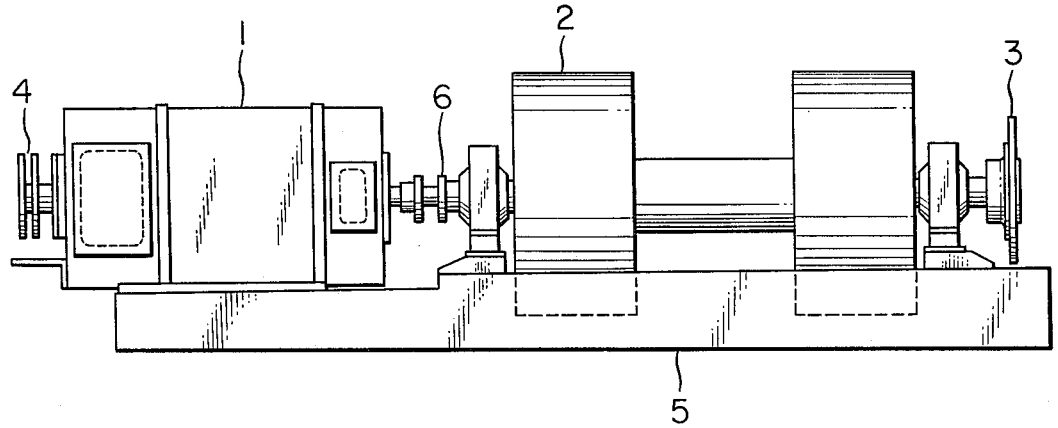
Figure 2:
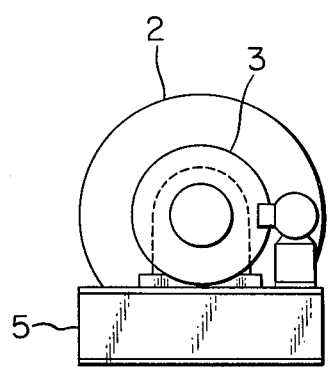
FIGS. 2 and 3 are right and left side views of the chassis dynamometer, respectively.
Figure 3:
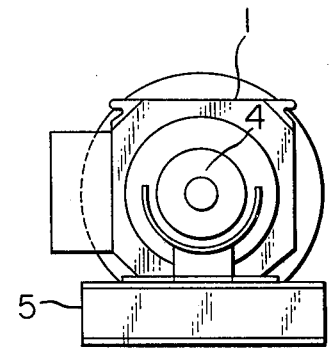

The arrangement of a chassis dynamometer which has heretofore been generally known is shown in FIGS. 1, 2 and 3. In these figures, numeral 1 designates a dynamo body, numeral 2 a drum assembly, numeral 3 the disc of a disc brake for preventing the rotation of the drum assembly, numeral 4 gears for detecting rotation, numeral 5 a bed, and numeral 6 a joint for coupling the dynamo body and the drum assembly.

Now, the operation and arrangement of a chassis dynamometer will be described. A chassis dynamometer is testing equipment for simulating the road driving test of an automobile as a finished car indoors, and it can readily and efficiently provide reliable data for grasping the performances of various components of the automobile and the overall performance of the finished car.

When a turning force is exerted from the tires (driving wheels) of the automobile on the drum assembly 2 corresponding to a road of infinite length, such force is transmitted from the drum assembly 2 to the joint or coupling 6 so as to finally drive the shaft of the dynamo.

The dynamometer controls the load in order that the load of the automobile during running may precisely act on the tested car. That is, the rolling resistance, grade resistance, windage resistance and inertial resistance of or on a road are simulatively controlled by the speed and weight of the car, the magnitude of a grade, etc.

The aforementioned turning force is measured in the form of a torque by means of the dynamo body 1, to confirm the performance of the automobile.

Most prior-art chassis dynamometers have a structure in which, as shown in FIGS. 1-3, the drum assembly and the dynamo body are arranged longitudinally in a straightline and are coupled by the joint.

Although such structure affords a comparatively high precision and can achieve load control with the dynamo, it is not always the most economical and is not the best with respect to utilization of space, either. The dynamometer system can be made smaller in size in such a way that a speed-up mechanism is disposed between the dynamo and the drum assembly, thereby to make the rotating speed of the dynamo higher than that of the drums. With this measure, however, the instability of the mechanical loss of the speed-up mechanism degrades the overall load precision of the system. In addition, of the gears of the speed-up mechanism exerts an undesirable influence on the responsiveness of the load control of the dynamometer. Therefore, the installation of the speed-up mechanism results in degradation of the overall performance of the dynamometer. After all, it is common practice to adopt the simplest construction in which the drum assembly and the dynamo are directly coupled in a straight line as illustrated in FIGS. 1-3.

Accordingly, the prior-art chassis dynamometer has a great axial length and becomes large due to size in such arrangement. Another disadvantage is that, since a large number of bearings are included, the number of components is large and vibrations are liable to occur.

This invention has been made in order to eliminate the disadvantages of the prior art as described above, and provides a chassis dynamometer which is rendered compact and easy of maintenance by arranging a dynamo body between the drums.

Figure 4:
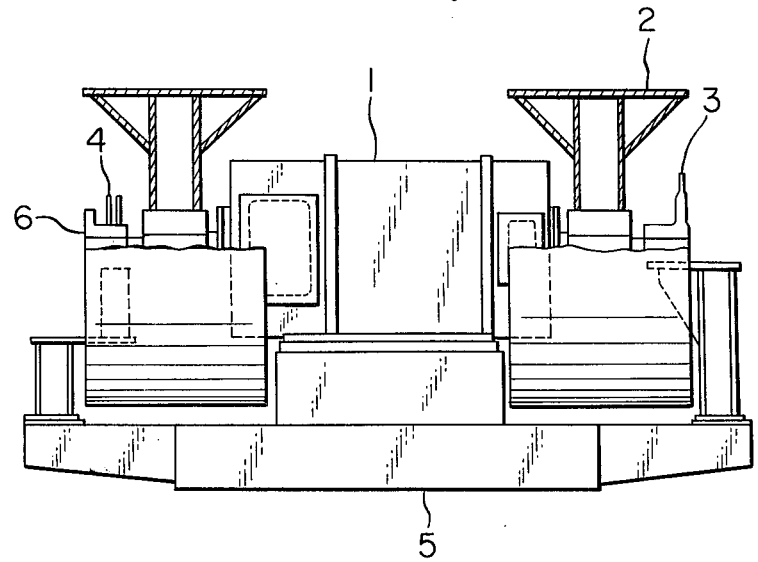
Figure 5:
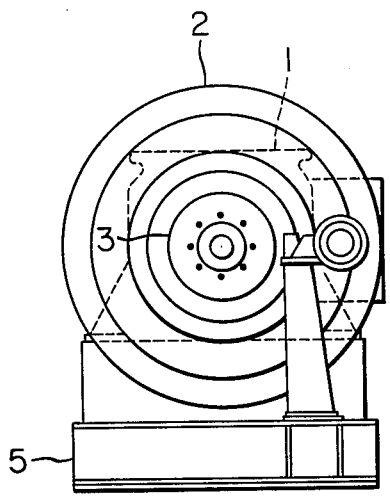
FIGS. 5 and 6 are right and left side views of the embodiment of FIG. 4, respectively.
Figure 6:
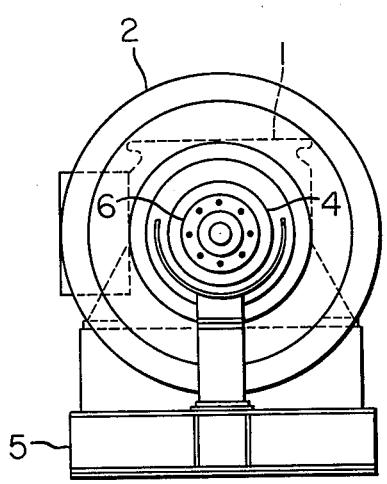

Hereunder, embodiments of this invention will be described with reference to the drawings. Referring to FIGS. 4, 5 and 6, numeral 1 designates a dynamo body, numeral 2 drums which are snugly fitted on the shaft of the dynamo body, numeral 3 the disc of a disc brake, numeral 4 gears for detecting rotation, numeral 5 a bed, and numeral 6 a joint. The joint or coupling 6 serves for external connection, and the disc 3 can serve for the same purpose. The disc brake functions to prevent the rotation of the drums when an automobile is placed on the drums and when it set apart from the drums.

The drums 2 which are driven by the tires (driving wheels) of the automobile placed on these drums drive th dynamo shaft directly. By directly driving the resulting turning force as a torque by means of the dynamo body 1, the performance of the automobile can be confirmed.

The disc 3 of the rotation preventing disc brake is mounted on an end portion of the rotating shaft at a position axially outwardly of the fitting of the respective drum to such end portion. The torque can be calibrated by directly coupling two dynamometers and inserting a torque meter midway. Also, a fixed intertia can be added by directly coupling a flywheel to the disc 3. Also, gears 4 and joint 6 are fitted to an end position of the shaft at a position axially outwardly of the fitting of the respective drum to such end portion.

Figure 7:
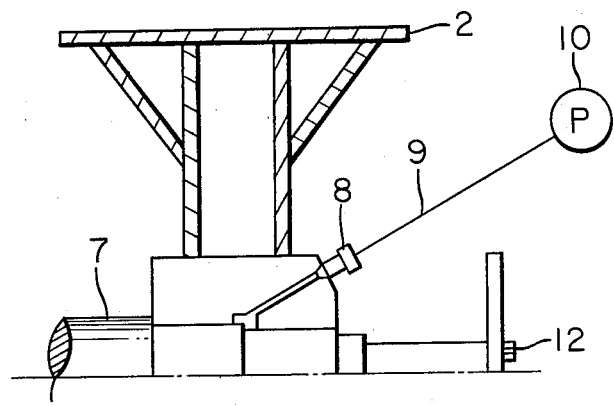
FIGS. 7 and 8 are structural sectional views of an embodiment of this invention showing procedures for removing and installing a drum, respectively.
Figure 8:
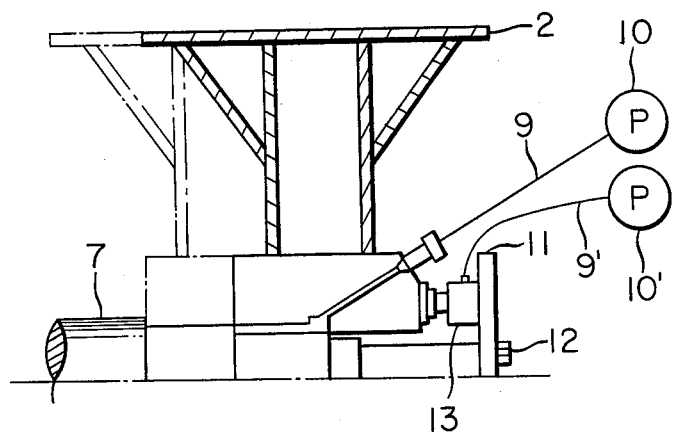

On the other hand, the snug fit between the drum 2 and the rotating shaft (7 in FIGS. 7 and 8) is based on oil injection (hydraulic fit). Now, the oil injection system embodying this invention will be described with reference to the drawings. Referring to FIGS. 7 and 8, numeral 8 indicates a fitting for supplying a high oil pressure externally, numeral 9 a high pressure hose, numeral 10 a hydraulic pump for generating the high oil pressure, numeral 11 a rigid holder plate or member which is used when pulling the drum out, i.e. removing the drum and when pushing it in, i.e. installing the drum, numeral 12 a clamping bolt for the holder plate, and numeral 13 a hydraulic ram which is used when pushing the drum in.

The oil injection (hydraulic fit) system facilitates the operations of pulling the drum out or pushing it in, the drum being snugly fitted with an interference, by generating oil pressure on a fitting surface and thus enlarging an inside diameter.

Procedure for removal:
(1) First, remove the brake disc (or the joint) fitted on the shaft end side.
(2) Attach the tools 8 to 12 as shown in FIG. 7.
(3) Generate the oil pressure in the fitting portion, and pull the drum out.

Owing to the joggling of the bore of the drum, part of the oil pressure generated in the fitting portion takes charge of the force of pulling the drum out.

Procedure for installation:
(1) Attach the tools 8 to 13 as shown in FIG. 8.
(2) While generating the oil pressure in the drum fitting portion, a thrust is applied to the drum by the thrusting hydraulic ram so as to push the drum in.
(3) Fit the brake disc (or the joint) snugly.

The above system can simplify the fitting operations, and can also facilitate the inspection and exchange of bearings.

As described above, according to this invention, the dynamo body is arranged between the drums, and hence, the system becomes compact.

In an example of a chassis dynamometer of a capacity of 75 kW for medium-sized or small-sized four-wheel passenger cars, a total length of 4620 mm and a total weight of 4450 kg in a prior-art structure could be reduced to 2400 mm and 2400 kg, respectively.

The system of this invention curtails the cost of the structure by about 30%.

Since the joint for coupling and the drum bearing portion are dispensed with, the mechanical efficiency is high and the loss is little, so that torque measurements of high precision are permitted.

We claim:
1. A chassis dynamometer comprising:
a bed;
a dynamo mounted on said bed, said dynamo having extending from opposite lateral sides thereof oppositely directed end portions of a dynamo shaft;
a pair of drums, each said drum being snugly fitted to a respective said end portion of said dynamo shaft;
a disc of a disc brake fitted to a first said end portion of said dynamo shaft at a position axially outwardly of the fitting of the respective said drum to said first end portion; and
a coupling joint fitted to a second said end portion of said dynamo shaft at a position axially outwardly of the fitting of the respective said drum to said second end portion.

2. A dynamometer as claimed in claim 1, wherein said disc is contained within the axial length of said drum fitted to said first end portion of said dynamo shaft.

3. A dynamometer as claimed in claim 1, further comprising rotation detecting gears between said second end portion of said dynamo shaft and said coupling joint.

4. A dynamometer as claimed in claim 3, wherein said gears and said coupling joint are contained within the axial length of said drum fitted to said second end portion of said dynamo shaft.

5. A dynamometer as claimed in claim 1, further comprising means for removing each said drum from and installing each said drum on the respective said end portion of said dynamo shaft by the introduction of high pressure fluid between the surfaces of the fit between said drum and said respective end portion.

6. A dynamometer as claimed in claim 5, wherein said means comprises a high pressure fluid pump, and a connection from said pump, through said drum, to the interface of said surfaces.

7. A dynamometer as claimed in claim 6, wherein said means further comprises a rigid member connectable to the outer end of said respective end portion, and hydraulic ram means supported by said rigid member and actuatable for pushing said drum axially inwardly onto said respective end portion.

* * * * *